(12) United States Patent
Sugihara et al.

(10) Patent No.: US 12,468,078 B2
(45) Date of Patent: Nov. 11, 2025

(54) OPTICAL FILTER

(71) Applicants: AGC Inc., Tokyo (JP); Optical Coatings Japan, Tokyo (JP)

(72) Inventors: Yosuke Sugihara, Tokyo (JP); Yasuyuki Takimoto, Tokyo (JP); Takahiro Mashimo, Tokyo (JP); Atsushi Koyanagi, Tokyo (JP); Naoto Tatsuoka, Tokyo (JP); Masaaki Miyake, Tokyo (JP); Hideaki Takahoshi, Tokyo (JP)

(73) Assignees: AGC Inc., Tokyo (JP); Optical Coatings Japan, Tokyo (JP)

( * ) Notice: Subject to any disclaimer, the term of this patent is extended or adjusted under 35 U.S.C. 154(b) by 858 days.

(21) Appl. No.: 17/645,786

(22) Filed: Dec. 23, 2021

(65) Prior Publication Data

US 2022/0206201 A1   Jun. 30, 2022

(30) Foreign Application Priority Data

Dec. 25, 2020 (JP) ................................ 2020-217140
Aug. 23, 2021 (JP) ................................ 2021-135902

(51) Int. Cl.
  *G02B 1/115*   (2015.01)
  *G02B 5/26*    (2006.01)
  *G02B 5/28*    (2006.01)

(52) U.S. Cl.
  CPC ............ *G02B 5/285* (2013.01); *G02B 1/115* (2013.01); *G02B 5/26* (2013.01); *G02B 5/282* (2013.01)

(58) Field of Classification Search
  CPC .......... G02B 5/285; G02B 1/115; G02B 5/26; G02B 5/282; G02B 5/281; G02B 5/208
  See application file for complete search history.

(56) References Cited

U.S. PATENT DOCUMENTS 5,398,133 A   3/1995  Tsai et al.
9,354,369 B2  5/2016  Hendrix et al.
(Continued)

FOREIGN PATENT DOCUMENTS

CN   111736249 A   10/2020

OTHER PUBLICATIONS

Pietruszko, S.M., & Jang, J., 2002, "Effect of hydrogen on stability of amorphous silicon thin films". Solar Energy Materials & Solar Cells, p. 459-564 excerpt taken from sciencedirect.com.*

(Continued)

*Primary Examiner* — Bumsuk Won
*Assistant Examiner* — John Curtis Sipes
(74) *Attorney, Agent, or Firm* — Oblon, McClelland, Maier & Neustadt, L.L.P.

(57) ABSTRACT

An optical filter includes a substrate and a dielectric multi-layer film laid as an outermost layer on at least one major surface of the substrate. The dielectric multilayer film includes a low-refractive index film and a high-refractive index film provided alternately. At least one film selected from the group consisting of the low-refractive index film and the high-refractive index film satisfies the following optical characteristics (i-1) and (i-2A): (i-1) an extinction coefficient $k_{600}$ at a wavelength of 600 nm is 0.12 or larger; and (i-2A) a minimum extinction coefficient $k_{1530\text{-}1570MIN}$ in a wavelength range of 1530 to 1570 nm is 0.01 or smaller; and the optical filter satisfies the following optical characteristic (ii-1A): (ii-1A) light in a wavelength range of 400 to 680 nm is blocked and light in the wavelength range of 1530 to 1570 nm is transmitted.

19 Claims, 6 Drawing Sheets

(56) References Cited

U.S. PATENT DOCUMENTS

| | | | | |
|---|---|---|---|---|
| 2005/0003665 A1* | 1/2005 | Steinberg | ............... | G02B 5/284 |
| | | | | 438/689 |
| 2009/0297838 A1* | 12/2009 | Knapp | ................ | C03C 17/3417 |
| | | | | 428/432 |
| 2010/0039707 A1* | 2/2010 | Akahane | .............. | G02B 3/0087 |
| | | | | 359/321 |
| 2011/0234536 A1* | 9/2011 | Yeo | ......................... | G06F 3/042 |
| | | | | 29/622 |

OTHER PUBLICATIONS

Roberts, J., & Wang, E., 2018, "Modeling and Optimization of Thin-Film Optical Devices using a Variational Autoencoder" Stanford University, taken from stanford.edu.*

* cited by examiner

OPTICAL FILTER

CROSS-REFERENCE TO RELATED APPLICATIONS

This application claims priority from Japanese Patent Application No. 2020-217140 filed on Dec. 25, 2020, and Japanese Patent Application No. 2021-135902 filed on Aug. 23, 2021, the entire subject matters of which are incorporated herein by reference.

The present disclosure relates to an optical filter that blocks visible light and transmits near infrared light.

BACKGROUND

An optical filter that transmits light in a near infrared wavelength range longer than 800 nm and blocks light in a visible range is used as covers of sensor modules for detection of near infrared light to enhance the sensor sensitivity. Furthermore, in optical filters, it is preferable that the transmittance of light in a visible wavelength range of 400 to 680 nm be low from the viewpoints of hiding the inside of a sensor from the outside and giving a cover a black appearance to be visually attractive.

Among common optical filters are reflection-type filters that reflect light, which is to be blocked, utilizing light interference of dielectric thin-films having different refractive indices and provided alternately (i.e., forming a dielectric multilayer film) on one surface or both surfaces of a transparent substrate.

Patent literature 1 discloses an optical filter having a dielectric multilayer film in which high-refractive index layers and low-refractive index layers are laminated alternately. The high-refractive index layers are silicon layers whose extinction coefficient k in a wavelength range of 800 to 1100 nm is smaller than 0.0005.

[Patent literature 1] U.S. Pat. No. 9,354,369

However, since the extinction coefficient of the high-refractive index layers in the wavelength range of 800 to 1100 nm is small, it is inferred that in the optical filter disclosed in Patent literature 1 the extinction coefficient in a wavelength range of 600 to 680 nm including a visible range would also be small, that is, the transmittance in this wavelength range would be high. Furthermore, if the reflectance in the wavelength range of 600 to 680 nm is increased to lower the transmittance in this wavelength range, the reflection color will become red to deteriorate the appearance.

SUMMARY

An object of the present invention is to provide an optical filter that is superior in the transmittance of near infrared light that is longer than 800 nm in wavelength and the ability to block visible light in a wavelength range of 400 to 680 nm.

The invention provides optical filters having the following configurations:

[1] An optical filter including a substrate and a dielectric multilayer film laid as an outermost layer on at least one major surface of the substrate, in which:
the dielectric multilayer film includes a low-refractive index film and high-refractive index film provided alternately;
at least one film selected from the group consisting of the low-refractive index film and the high-refractive index film satisfies the following optical characteristics (i-1) and (i-2A):

(i-1) an extinction coefficient $k_{600}$ at a wavelength of 600 nm is 0.12 or larger; and
(i-2A) a minimum extinction coefficient $k_{1530-1570MIN}$ in a wavelength range of 1530 to 1570 nm is 0.01 or smaller; and
the optical filter satisfies the following optical characteristic (ii-1A):
(ii-1A) light in a wavelength range of 400 to 680 nm is blocked and light in the wavelength range of 1530 to 1570 nm is transmitted.

[2] An optical filter including a substrate and a dielectric multilayer film laid as an outermost layer on at least one major surface of the substrate, in which:
the dielectric multilayer film includes a low-refractive index film and high-refractive index film provided alternately;
at least one film selected from the group consisting of the low-refractive index film or the high-refractive index film satisfies the following optical characteristics (i-1) and (i-2B):

(i-1) an extinction coefficient $k_{600}$ at a wavelength of 600 nm is 0.12 or larger; and
(i-2B) a minimum extinction coefficient $k_{1310-1350MIN}$ in a wavelength range of 1310 to 1350 nm is 0.01 or smaller; and
the optical filter satisfies the following optical characteristic (ii-1B):
(ii-1B) light in a wavelength range of 400 to 680 nm is blocked and light in the wavelength range of 1310 to 1350 nm is transmitted.

[3] An optical filter including a substrate and a dielectric multilayer film laid as an outermost layer on at least one major surface of the substrate, in which:
the dielectric multilayer film includes a low-refractive index film and high-refractive index film provided alternately;
at least one film selected from the group consisting of the low-refractive index film and the high-refractive index film satisfies the following optical characteristics (i-1) and (i-2C):

(i-1) an extinction coefficient $k_{600}$ at a wavelength of 600 nm is 0.12 or larger; and
(i-2C) a minimum extinction coefficient $k_{800-1000MIN}$ in a wavelength range of 800 to 1000 nm is 0.01 or smaller; and
the optical filter satisfies the following optical characteristic (ii-1C):
(ii-1C) light in a wavelength range of 400 to 680 nm is blocked and light in the wavelength range of 800 to 1000 nm is transmitted.

[4] The optical filter according to item [1], in which the optical filter further satisfies the following optical characteristic (ii-4A):
(ii-4A) a minimum transmittance $T_{1530-1570MIN}$ in the wavelength range of 1530 to 1570 nm is 90% or higher.

[5] The optical filter according to item [2], in which the optical filter further satisfies the following optical characteristic (ii-4B):
(ii-4B) a minimum transmittance $T_{1310-1350MIN}$ in the wavelength range of 1310 to 1350 nm is 90% or higher.

[6] The optical filter according to item [3], in which the optical filter further satisfies the following optical characteristic (ii-4C):

(ii-4C) a minimum transmittance $T_{880-920MIN}$ in the wavelength range of 880 to 920 nm is 90% or higher.

[7] The optical filter according to any one of items [1] to [6], in which the optical filter further satisfies the following optical characteristic (ii-2) and (ii-3):
(ii-2) a maximum transmittance $T_{400-680MAX}$ in the wavelength range of 400 to 680 nm is 6% or lower; and
(ii-3) at least one of a maximum reflectance $R_{400-680MAX}$ and an average reflectance $R_{400-680AVL}$ in the wavelength range of 400 to 680 nm is 10% or lower.

[8] The optical filter according to any one of items [1] to [7], in which the dielectric multilayer film is 2.0 μm or smaller in thickness. [9] The optical filter according to any one of items [1] to [8], in which the high-refractive index films are silicon films and have a spin density of $5.0 \times 10^{10}/(nm \cdot cm^2)$ or higher.

The invention can provide an optical filter that is superior in the transmittance of near infrared light that is longer than 800 nm in wavelength and the ability to block visible light in a wavelength range of 400 to 680 nm.

DETAILED DESCRIPTION

In this specification, the transmittance in a particular wavelength range being 90% or higher means that the transmittance is not lower than 90% over the particular wavelength range, that is, the lowest transmittance in the particular wavelength range is 90% or higher. Likewise, the transmittance in a particular wavelength range being 1% or lower means that the transmittance is not higher than 1% over the particular wavelength range, that is, the highest transmittance in the particular wavelength range is 1% or lower. An average transmittance in a particular wavelength range is an arithmetic mean of transmittance values obtained every 1 nm in the wavelength range. The refractive index is a refractive index for light having a wavelength of 589 nm at 20° C., unless otherwise specified.

Optical characteristics can be measured using an ultraviolet-visible spectrophotometer or calculated by a simulation using an optical thin-film calculation software.

An extinction coefficient can be determined by measuring reflectance, transmittance, and a thickness of a single-layer film formed on a quartz substrate and then using an optical thin-film calculation software.

A spin density can be measured using an electron spin resonance instrument.

In this specification, a numerical value range expressed using the hyphen (-) or the word "to" includes the upper limit and the lower limit.

(Optical Filter)

An optical filter according to an embodiment of the invention (hereinafter also referred to as a "present filter") is an optical filter having a substrate and a dielectric multilayer film that is laid as an outermost layer on at least one major surface of the substrate.

Figure 1:
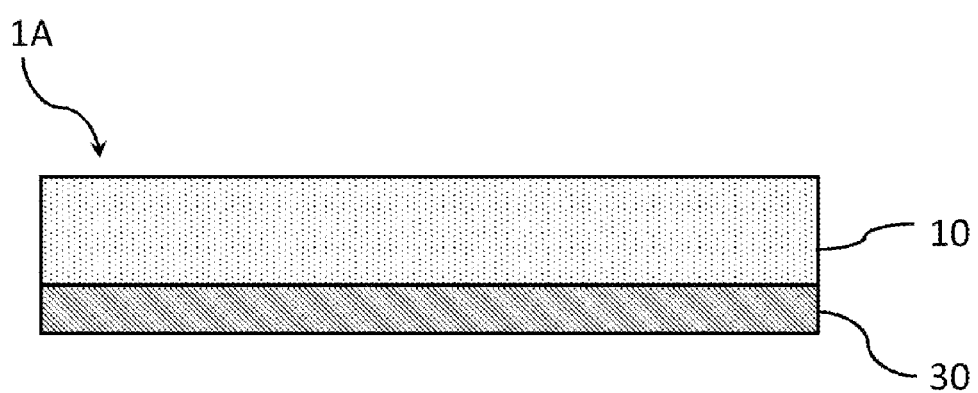
FIG. 1 is a schematic sectional view of an example of an optical filter according to an embodiment.
Figure 2:
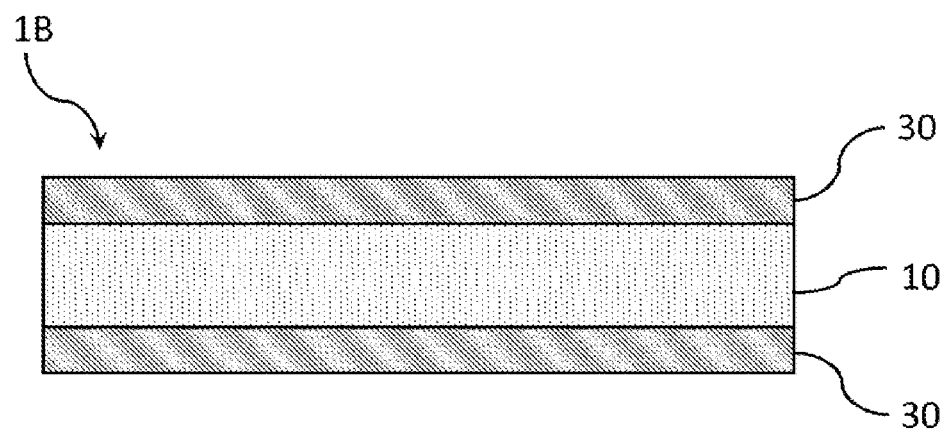
FIG. 2 is a schematic sectional view of another example of an optical filter according to an embodiment.

Example structures of the present filter will be described with reference to drawings. FIGS. 1 and 2 are schematic sectional views of examples of optical filters according to the embodiment.

An optical filter 1A illustrated in FIG. 1 is an example in which a dielectric multilayer film 30 is formed on one major surface of a substrate 10. The expression "to have a particular layer on a major surface of a substrate" is not limited to a case where the layer is in contact with the major surface and includes a case where another functional layer exists between the substrate and the particular layer.

An optical filter 1B illustrated in FIG. 2 is an example in which dielectric multilayer films 30 are formed on both of the major surfaces of a substrate 10.

(Dielectric Multilayer Film(s))

In the present filter, the dielectric multilayer film is formed on at least one major surface of the substrate as an outermost layer.

The dielectric multilayer film is designed so as to be wavelength-selective and at least one dielectric multilayer film is a visible light absorption film that blocks visible light mainly by absorption and transmits near infrared light. In the case where a dielectric multilayer film is formed on each of the major surfaces of the substrate, either both of the dielectric multilayer films or only one of them may be a visible light absorption film. In the case where one of the dielectric multilayer films is a visible light absorption film, the other dielectric multilayer film may be designed as a film for another purpose such as an antireflection film.

The dielectric multilayer film is a laminate in which a low-refractive index film(s) and a high-refractive index film(s) are laminated alternately. Laminating thin-films having different reflective indices on each other makes it possible to increase or decrease the reflectance utilizing light interference action. The transmittance decreases as the reflectance increases.

The extinction coefficient varies depending on the materials of the multilayer film. The light absorption increases and the transmittance decreases as the extinction coefficient becomes larger.

In the invention, an optical filter having target optical characteristics is designed taking the refractive index and extinction coefficient of each multilayer film into consideration.

In the invention, the low-refractive index film or the high-refractive index film satisfies the following optical characteristic (i-1) in a visible range and satisfies one of the following optical characteristics (i-2A) to (i-2C) in a near infrared range:

(i-1) The extinction coefficient $k_{600}$ at a wavelength of 600 nm is 0.12 or larger;

(i-2A) The minimum extinction coefficient $k_{1530-1570MIN}$ in a wavelength range of 1530 to 1570 nm is 0.01 or smaller;

(i-2B) The minimum extinction coefficient $k_{1310-1350MIN}$ in a wavelength range of 1310 to 1350 nm is 0.01 or smaller; and (i-2C) The minimum extinction coefficient $k_{800-1000MIN}$ in a wavelength range of 800 to 1000 nm is 0.01 or smaller.

Here, for example, the expression "the high-refractive index film satisfies the optical characteristic (i-1)" means that at least one film of the high-refractive index films satisfies the optical characteristic, and all of the high-refractive index films may satisfy the optical characteristic (i-1). The same can be applied to the low-refractive index film and the other optical characteristics.

As for the optical characteristic (i-1), red light around 600 nm can be blocked by absorption rather than reflection because $k_{600}$ of any of the dielectric films is 0.12 or larger. Since it is therefore not necessary to increase the reflectance around 600 nm, the reflection light of the obtained optical filter is not prone to be red. The extinction coefficient kw) is preferably 0.18 or larger, and is preferably 1.00 or smaller.

To make $k_{600}$ of the dielectric film fall within the above range, in the case of, for example, the high-refractive index film, it can be made of amorphous silicon that is not doped with hydrogen or is doped with hydrogen at a concentration corresponding to 20 sccm or lower. It is preferable to use amorphous silicon that is not doped with hydrogen. The extinction coefficient $k_{600}$ can also be adjusted by changing the method for forming the dielectric film.

Each of the optical characteristics (i-2A) to (i-2C) relates to a minimum extinction coefficient of the dielectric film in a near infrared range. Satisfaction of one of the optical characteristics (i-2A) to (i-2C) means that the absorption is low in the wavelength range of the respective optical characteristics. By further making the reflectance low in the respective wavelength ranges, the optical filter can transmit near infrared light sufficiently in the wavelength ranges.

As for the optical characteristic (i-2A), in the case where the minimum extinction coefficient $k_{1530\text{-}1570MIN}$ in the wavelength range of 1530 to 1570 nm is 0.01 or smaller, the optical filter can transmit near infrared light sufficiently in the wavelength range of 1530 to 1570 nm. The minimum extinction coefficient $k_{1530\text{-}1570MIN}$ is preferably 0.002 or smaller. The lower limit of the minimum extinction coefficient $k_{1530\text{-}1570MIN}$ is not particularly limited.

As for the optical characteristic (i-2B), in the case where the minimum extinction coefficient $k_{1310\text{-}1350MIN}$ in the wavelength range of 1310 to 1350 nm is 0.01 or smaller, the optical filter can transmit near infrared light sufficiently in the wavelength range of 1310 to 1350 nm. The minimum extinction coefficient $k_{1310\text{-}1350MIN}$ is preferably 0.005 or smaller. The lower limit of the minimum extinction coefficient $k_{1310\text{-}1350MIN}$ is not particularly limited.

As for the optical characteristic (i-2C), in the case where the minimum extinction coefficient $k_{800\text{-}1000MIN}$ in the wavelength range of 800 to 1000 nm is 0.01 or smaller, the optical filter can transmit near infrared light sufficiently in the wavelength range of 800 to 1000 nm, in particular 880 to 920 nm. The minimum extinction coefficient $k_{800\text{-}1000MIN}$ is preferably 0.005 or smaller. On the other hand, since red light around a wavelength of 600 nm can be blocked by absorption rather than reflection by setting $k_{600}$ at a proper large value, $k_{800\text{-}1000MIN}$ is preferably 0.0005 or larger.

To make $k_{1530\text{-}1570MIN}$, $k_{1310\text{-}1350MIN}$, or $k_{800\text{-}1000MIN}$ of the dielectric film fall within the above range, in the case of, for example, the high-refractive index film, use can be made of amorphous silicon that is not doped with hydrogen or is doped with hydrogen at a concentration corresponding to 20 sccm or lower. It is preferable to use amorphous silicon that is not doped with hydrogen. Each extinction coefficient can also be adjusted by changing the method for forming the dielectric film.

In the following, an optical filter in which at least one film selected from the group consisting of the low-refractive index film and the high-refractive index film satisfies the optical characteristic (i-2A) will be referred to as an "optical filter A," an optical filter in which at least one film selected from the group consisting of the low-refractive index film and the high-refractive index film satisfies the optical characteristic (i-2B) will be referred to as an "optical filter B," and an optical filter in which at least one film selected from the group consisting of the low-refractive index film and the high-refractive index film satisfies the optical characteristic (i-2C) will be referred to as an "optical filter C."

In the optical filter A or optical filter B, it is preferable that the low-refractive index film or the high-refractive index film further satisfies the following optical characteristic (i-3).

(i-3) The minimum extinction coefficient $k_{800\text{-}1000MIN}$ in the wavelength range 800 to 1000 nm is 0.0005 or larger.

In the case where $k_{800\text{-}1000MIN}$ is 0.0005 or larger, $k_{600}$ can be made a proper large value and red light around 600 nm can be blocked by absorption rather than reflection. The minimum extinction coefficient $k_{800\text{-}1000MIN}$ is preferably 0.001 or larger, and preferably 0.1 or smaller.

From the viewpoint of the degree of freedom in designing, it is preferable that the dielectric film that satisfies the optical characteristic (i-1) and one of the optical characteristics (i-2A) to (i-2C) be a high-refractive index film. In this case, as for the low-refractive index films and the remaining high-refractive index films, the extinction coefficient $k_{600}$ is preferably 0, the minimum extinction coefficient $k_{1530\text{-}1570MIN}$ in the wavelength range of 1530 to 1570 nm is preferably 0, the minimum extinction coefficient $k_{1310\text{-}1350MIN}$ in the wavelength range of 1310 to 1350 nm is preferably 0, and the minimum extinction coefficient $k_{800\text{-}1000MIN}$ in the wavelength range of 800 to 1000 nm is preferably 0.

Examples of materials of the high-refractive index film include silicon, $Ta_2O_5$, $TiO_2$, $Nb_2O_5$, and SiN. Among these materials, silicon is preferable and amorphous silicon is particularly preferable from the viewpoint of the ease of attaining the above-mentioned particular extinction coefficient values.

The refractive index of the high-refractive index film is preferably 3.5 or higher and even preferably 4.0 or higher.

From the viewpoint of setting $k_{600}$ to 0.12 or larger, silicon that is not doped with hydrogen or is doped with hydrogen at a low concentration is preferable and silicon that is not doped with hydrogen is particularly preferable. Doping with hydrogen can be performed by a known method and it is preferable that doping be performed at 20 sccm or lower.

Examples of materials of the low-refractive index film include $SiO_2$, $SiO_xN_y$, $Ta_2O_5$, $TiO_2$, and SiO. Among these materials, materials having lower refractive indices than the material of the high-refractive index film may be used in combination. From the viewpoint of productivity, $SiO_2$ is preferable.

The refractive index of the low-refractive index film is preferably 2.5 or lower and even preferably 1.5 or lower.

The spin density of the high-refractive index film is preferably $5.0 \times 10^{10}/(\text{nm·cm}^2)$ or higher and even preferably $1.0 \times 10^{12}/(\text{nm·cm}^2)$ or higher. The term "spin density" means the density of dangling bonds in the film. The spin density of the high-refractive index film being in this range makes it easier to attain the above-mentioned particular extinction coefficient values.

The spin density of the high-refractive index film can be set in the above range by, for example, using silicon that is not doped with hydrogen or is doped with silicon at a low concentration.

The spin density can be measured using an electron spin resonance instrument. Spins that can be detected by the electron spin resonance instrument include not only silicon dangling bonds but also dangling bonds in a silica film, transition metal ions in glass, etc. It is therefore necessary to perform proper working on a sample before a measurement and perform peak separation after the measurement.

As for the working on a sample, an optical filter including a multilayer film is cut as appropriate, and then the substrate glass on which the multilayer film is formed is removed as much as possible by polishing, such that influence of a spin signal originating from the substrate glass can be reduced. Peak separation after a measurement can be performed by curve fitting, for example. A signal indicating silicon dangling bonds is obtained as an isotropic signal with g of 2.004 to 2.007 and a line width of 4 to 8 gauss. This parameter is obtained as a result of peak separation by curve fitting using a linear combination function of a Gaussian function and a Lorentz function that are equalized in line width. The term "line width" as used herein means the difference in magnetic field values between a top of peak and a bottom of valley in an electron spin resonance spectrum that is obtained in a derivative form.

In the case where the dielectric multilayer film(s) is designed as a visible light absorption film, from the viewpoint of light blocking property in a visible range, the total number of laminated films is preferably 10 or more, even preferably 15 or more, and further preferably 20 or more. However, since the total number of laminated films being too large may cause a warp or the like or an unduly large total film thickness, the total number of laminated films is preferably 70 or less, even preferably 60 or less, and further preferably 50 or less.

From the viewpoint of productivity, the thickness of the dielectric multilayer film(s) is preferably 2.0 λm or smaller, even preferably 1.5 λm or smaller, and further preferably 1.0 λm or smaller. In the case where two or more layers of a dielectric multilayer film (two or more groups of dielectric multilayer films) are formed, the total thickness of the dielectric multilayer films is preferably 2.0 λm or smaller, even preferably 1.5 λm or smaller, and further preferably 1.0 μm or smaller.

According to the invention, sufficient light blocking in a visible range can be attained even if the number of films of or in, or the film thickness of the dielectric multilayer film(s) is small. This is because the dielectric multilayer film employed in the invention has a large extinction coefficient in the visible range and hence can block visible light through absorption.

It is preferable that the dielectric multilayer film further satisfies the following optical characteristics.

In order that the colors of transmitted light and reflected light are both black, the maximum transmittance $T_{400-680MAX}$ in a wavelength range of 400 to 680 nm is preferably 6% or lower and the maximum reflectance $R_{400-680MAX}$ as viewed from the side of one major surface in the wavelength range of 400 to 680 nm is preferably 10% or lower.

To increase the sensitivity of a sensor, the minimum transmittance $T_{1530-1570MIN}$ of the dielectric multilayer film(s) of the optical filter A in the wavelength range of 1530 to 1570 nm is preferably 90% or higher, the minimum transmittance $T_{1310-1350MIN}$ of the dielectric multilayer film(s) of the optical filter B in the wavelength range of 1310 to 1350 nm is preferably 90% or higher, and the minimum transmittance $T_{800-1000MIN}$ of the dielectric multilayer film(s) of the optical filter C in the wavelength range of 800 to 1000 nm is preferably 90% or higher.

The minimum transmittance in the above wavelength ranges can fall within the above respective ranges by using a multilayer film whose minimum extinction coefficient in the wavelength range satisfy the above-mentioned respective optical characteristics (i-2A), (i-2B), and (i-2C) and making its reflectance in the wavelength range small.

For example, the dielectric multilayer film(s) can be formed by a vacuum film forming process such as chemical vapor deposition (CVD), sputtering, or vacuum evaporation, a wet film forming process such as a spray method or a dip method, or the like.

The dielectric multilayer film(s) may be given prescribed optical characteristics by one layer (one group of dielectric multilayer film) or two or more layers. In the case of two or more layers, the dielectric multilayer films may have either the same structure or different structures. Two or more layers of a dielectric multilayer film may be formed in such a manner that one layer is a visible light absorption layer that transmits near infrared light and blocks visible light and another layer is a visible/near infrared light transmission layer that transmits both of near infrared light and visible light.

In the case where the present filter has two or more layers of a dielectric multilayer film, it is preferable that at least one dielectric multilayer film contain a low-refractive index film and/or a high-refractive index film satisfying the above-mentioned optical characteristic (i-1) and one of the above-mentioned optical characteristics (i-2A) to (i-2C).

Also in the case where the dielectric multilayer film(s) is designed as an antireflection film, dielectric films having different refractive indices are laminated alternately as in the case of a visible light absorption film. An antireflection film may be in a form other than a dielectric multilayer film, and may be formed of an intermediate refractive index medium or a moth-eye structure in which the refractive index varies gradually, for example.

(Substrate)

The substrate of the present filter may have either a single-layer structure or a multilayer structure. The material of the substrate is not particularly limited as long as it is made of a transparent material that transmits near infrared light. The material of the substrate may be either an organic material or an inorganic material. The substrate may be a composite substrate made of plural different materials.

The transparent inorganic material is preferably glass or a crystalline material.

Examples of the glass include soda-lime glass, borosilicate glass, alkali-free glass, quartz glass, and aluminosilicate glass.

Alternately, use may be made of chemically strengthened glass that is obtained by replacing alkali metal ions having a small ion radius (e.g., Li ions or Na ions) existing in the major surface of a glass plate with alkali ions having a larger ion diameter (e.g., Na ions or K ions for Li ions and K ions for Na ions) by ion exchange at a temperature that is lower than a glass transition temperature.

Examples of the crystalline material include birefringent crystals such as quartz crystal, lithium niobite, and sapphire.

There are no particular limitations on the shape of the substrate. The substrate may have a block shape, a plate shape, or a film shape.

From the viewpoints of decreasing a warp during formation of a dielectric multilayer film, decreasing the height of an optical device, and preventing fracture, the thickness of the substrate is preferably 0.1 mm or larger and 5 mm or smaller and even preferably in a range of 2 to 4 mm.
(Optical filter)

The optical filter according to the invention including the above-described substrate and dielectric multilayer film(s) functions as an IR bandpass filter that blocks visible light and transmits near infrared light.

The optical filter A according to the invention satisfies the following optical characteristic (ii-1A)
(ii-1A) Light in the wavelength range of 400 to 680 nm is blocked and light in the wavelength range of 1530 to 1570 nm is transmitted.

The optical filter (B) according to the invention satisfies the following optical characteristic (ii-1B).
(ii-1B) Light in the wavelength range of 400 to 680 nm is blocked and light in the wavelength range of 1310 to 1350 nm is transmitted.

The optical filter (C) according to the invention satisfies the following optical characteristic (ii-1C).
(ii-1C) Light in the wavelength range of 400 to 680 nm is blocked and light in the wavelength range of 800 to 1000 nm is transmitted.

Since light in the wavelength range of 1530 to 1570 nm, light in the wavelength range of 1310 to 1350 nm, or light in the wavelength range of 800 to 1000 nm is transmitted, the sensitivity of a sensor can be enhanced in accordance with the respective wavelength ranges.

In the optical characteristics (ii-1A) to (ii-1C), "light in the wavelength range of 400 to 680 nm is blocked" preferably means that the following optical characteristics (ii-2) and/or (ii-3) are satisfied.

That is, it is preferable that the present filter further satisfy the following optical characteristics (ii-2) and (ii-3):
(ii-2) The maximum transmittance $T_{400-680MAX}$ in the wavelength range of 400 to 680 nm is 6% or lower.
(ii-3) At least one of the maximum reflectance $R_{400-680MAX}$ and the average reflectance $R_{400-680AVE}$ in the wavelength range of 400 to 680 nm is 10% or lower.

The optical characteristic (ii-2) means that light in the wavelength range of 400 to 680 nm (i.e., visible light) is blocked. The maximum transmittance $T_{400-680MAX}$ is preferably 2% or lower. An optical filter that is high in the ability to block visible light can be obtained by utilizing reflection ability and absorption ability of the dielectric multilayer film(s).

As for the optical characteristic (ii-3), since the reflectance in the visible range as viewed from the side of one major surface is low, an optical filter can be obtained that hardly produces reflection color and appears black and hence is visually attractive. At least one of the maximum reflectance $R_{400-680MAX}$ and the average reflectance $R_{400-680AVE}$ is preferably 5% or lower.

The average reflectance $R_{400-680AVE}$ of an optical filter is a value measured from the side of the dielectric multilayer film that prevents reflection of visible light and transmits near infrared light.

In the optical characteristics (ii-1A), "light in the wavelength range of 1530 to 1570 nm is transmitted" preferably means that the following optical characteristics (ii-4A) is satisfied.

That is, it is preferable that the optical filter A according to the invention further satisfy the following optical characteristic (ii-4A), such that the sensitivity of a sensor can be enhanced further:
(ii-4A) The minimum transmittance $T_{1530-1570MIN}$ in the wavelength range of 1530 to 1570 nm is 90% or higher.

The minimum transmittance $T_{1530-1570MIN}$ is even preferably 95% or higher.

To make $T_{1530-1570MIN}$ fall within the above range, for example, use can be made of a dielectric multilayer film that satisfies the above-mentioned optical characteristic (i-2A), that is, has low absorbance in the wavelength range of 1530 to 1570 nm, and whose reflectance is made low in the wavelength range of 1530 to 1570 nm.

In the optical characteristics (ii-1B), "light in the wavelength range of 1310 to 1350 nm is transmitted" preferably means that the following optical characteristics (ii-4B) is satisfied.

That is, it is preferable that the optical filter B according to the invention further satisfy the following optical characteristic (ii-4B), such that the sensitivity of a sensor can be enhanced further:
(ii-4B) The minimum transmittance $T_{1310-1350MIN}$ in the wavelength range of 1310 to 1350 nm is 90% or higher.

The minimum transmittance $T_{1310-1350MIN}$ is even preferably 95% or higher.

To make $T_{1310-1350MIN}$ fall within the above range, for example, use can be made of a dielectric multilayer film that satisfies the above-mentioned optical characteristic (i-2B), that is, has low absorbance in the wavelength range of 1310 to 1350 nm, and whose reflectance is made low in the wavelength range of 1310 to 1350 nm.

In the optical characteristics (ii-1C), "light in the wavelength range of 800 to 1000 nm is transmitted" preferably means that the following optical characteristics (ii-4C) is satisfied.

That is, it is preferable that the optical filter C according to the invention further satisfy the following optical characteristic (ii-4C), such that the sensitivity of a sensor can be enhanced further:
(ii-4C) The minimum transmittance $T_{880-920MIN}$ in the wavelength range of 880 to 920 nm is 90% or higher.

The minimum transmittance $T_{880-920MIN}$ is even preferably 92% or higher.

To make $T_{880-920MIN}$ fall within the above range, for example, use can be made of a dielectric multilayer film that satisfies the above-mentioned optical characteristic (i-2C), that is, has low absorbance in the wavelength range of 800 to 1000 nm, and whose reflectance is made low in the wavelength range of 880 to 920 nm.

The above-described optical filters according to the embodiment can be increased in the ability to block visible light and the transmittance of near infrared light.

Next, the invention will be described in more detail using Examples.

A spectral transmittance curve and a spectral reflectance curve of an optical filter of each Example were calculated by simulations using an optical thin-film calculation software.

An extinction coefficient of amorphous silicon employed in each Example was measured by measuring a reflectance, a transmittance, and a thickness of a single-layer film formed on a quartz substrate and then performing a calculation using the optical thin-film calculation software.

Figure 7:
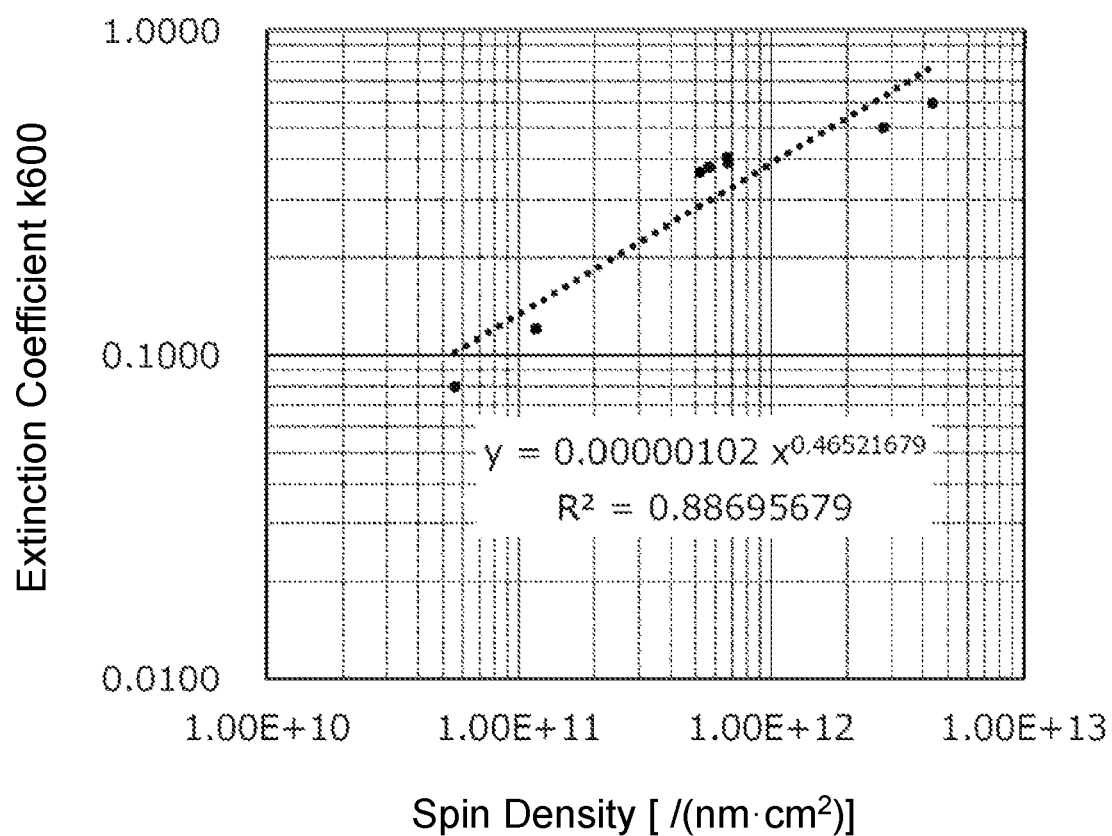
FIG. 7 shows a relationship between the spin density and the extinction coefficient $k_{600}$.

A spin density of the amorphous silicon employed in each Example was calculated using an approximate equation shown in FIG. 7 on the basis of an extinction coefficient $k_{600}$.

Example 1

A visible light-absorption and near infrared light-transmission film that was a 1.0-μm thick dielectric multilayer film was formed on one major surface of a super white glass plate to serve as a transparent substrate by laminating amorphous silicon layers (refractive index: 4.5) and SiO$_2$ layers (refractive index: 1.5) alternately by vacuum evaporation so that the total number of layers was 24. Then a visible light-antireflection and near infrared light-transmission film that was a 1.0-μm thick dielectric multilayer film was formed on the other major surface of the glass plate by laminating amorphous silicon layers (refractive index: 4.5) and SiO$_2$ layers (refractive index: 1.5) alternately by vacuum evaporation so that the total number of layers was 24, thereby obtaining an optical filter 1.

Example 2

A visible light-absorption and near infrared light-transmission film that was a 0.7-μm thick dielectric multilayer film was formed on one major surface of a super white glass plate to serve as a transparent substrate by laminating amorphous silicon layers (refractive index: 4.7) and SiO$_2$ layers (refractive index: 1.5) alternately by sputtering so that the total number of layers was 13. Then a visible light-antireflection and near infrared light-transmission film that was a 1.0-μm thick dielectric multilayer film was formed on the other major surface of the glass plate by laminating amorphous silicon layers (refractive index: 4.7) and SiO$_2$ layers (refractive index: 1.5) alternately by sputtering so that the total number of layers was 14, thereby obtaining an optical filter 2.

Example 3

A visible light-absorption and near infrared light-transmission film that was a 1.1-μm thick dielectric multilayer film was formed on one major surface of a super white glass plate to serve as a transparent substrate by laminating hydrogen-doped amorphous silicon layers (refractive index: 4.3) and SiO$_2$ layers (refractive index: 1.5) alternately by sputtering so that the total number of layers was 21. Then a visible light-antireflection and near infrared light-transmission film that was a 0.8-μm thick dielectric multilayer film was formed on the other major surface of the glass plate by laminating hydrogen-doped amorphous silicon layers (refractive index: 4.3) and SiO$_2$ layers (refractive index: 1.5) alternately by sputtering so that the total number of layers was 19, thereby obtaining an optical filter 3.

Example 4

A visible light-absorption and near infrared light-transmission film that was a 1.3-μm thick dielectric multilayer film was formed on one major surface of a super white glass plate to serve as a transparent substrate by laminating amorphous silicon layers (refractive index: 4.7) and SiO$_2$ layers (refractive index: 1.5) alternately by sputtering so that the total number of layers was 11. Then a visible light-antireflection and near infrared light-transmission film that was a 1.8-μm thick dielectric multilayer film was formed on the other major surface of the glass plate by laminating amorphous silicon layers (refractive index: 4.7) and SiO$_2$ layers (refractive index: 1.5) alternately by sputtering so that the total number of layers was 23, thereby obtaining an optical filter 4.

Example 5

A visible light-absorption and near infrared light-transmission film that was a 1.1-μm thick dielectric multilayer film was formed on one major surface of a super white glass plate to serve as a transparent substrate by laminating amorphous silicon layers (refractive index: 4.7) and SiO$_2$ layers (refractive index: 1.5) alternately by sputtering so that the total number of layers was 9. Then a visible light-antireflection and near infrared light-transmission film that was a 1.5-μm thick dielectric multilayer film was formed on the other major surface of the glass plate by laminating amorphous silicon layers (refractive index: 4.7) and SiO$_2$ layers (refractive index: 1.5) alternately by sputtering so that the total number of layers was 22, thereby obtaining an optical filter 5.

Example 6

A visible light-absorption and near infrared light-transmission film that was a 0.9-μm thick dielectric multilayer film was formed on one major surface of a super white glass plate to serve as a transparent substrate by laminating amorphous silicon layers (refractive index: 4.7) and SiO$_2$ layers (refractive index: 1.5) alternately by sputtering so that the total number of layers was 21. Then a visible light-antireflection and near infrared light-transmission film that was a 0.3-μm thick dielectric multilayer film was formed on the other major surface of the glass plate by laying amorphous silicon layers (refractive index: 4.7) and SiO$_2$ layers (refractive index: 1.5) alternately by sputtering so that the total number of layers was 11, thereby obtaining an optical filter 6.

Optical characteristics of the optical filter of each Example and extinction coefficients and a spin density calculated from the extinction coefficients of the amorphous silicon layer of the optical filter of each Example are shown in Table 1 below.

Figure 3:
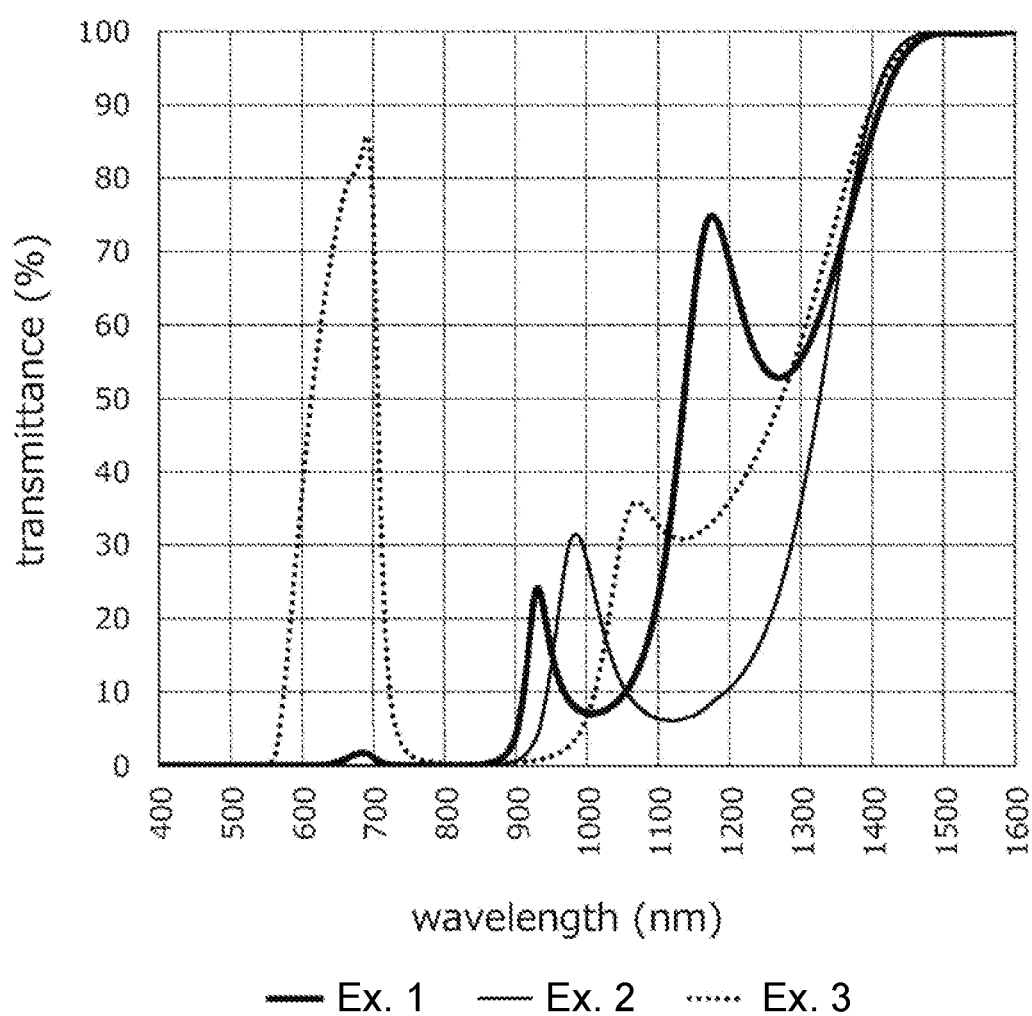
FIG. 3 shows spectral transmission curves of optical filters of Examples 1-3.
Figure 4:
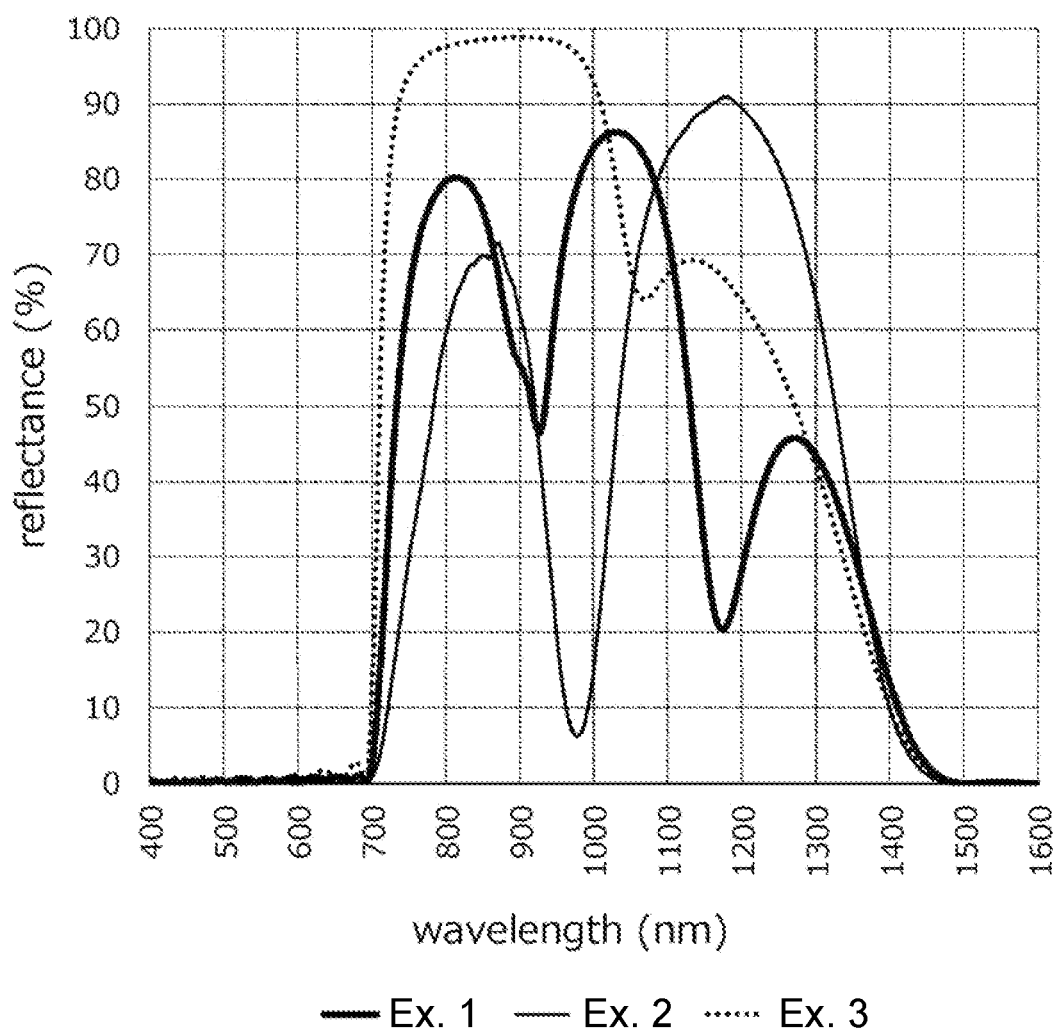
FIG. 4 shows spectral reflectance curves of optical filters of Examples 1-3.
Figure 5:
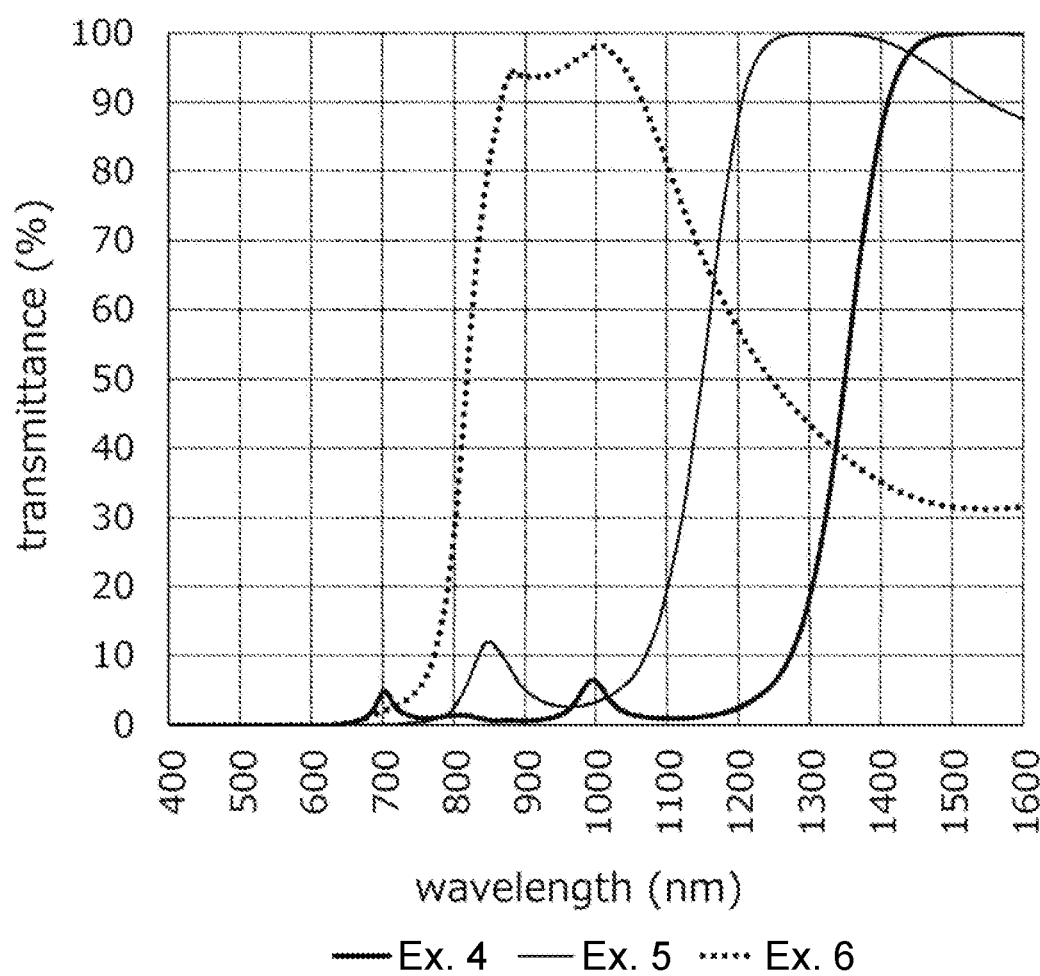
FIG. 5 shows spectral transmission curves of optical filters of Examples 4-6.
Figure 6:
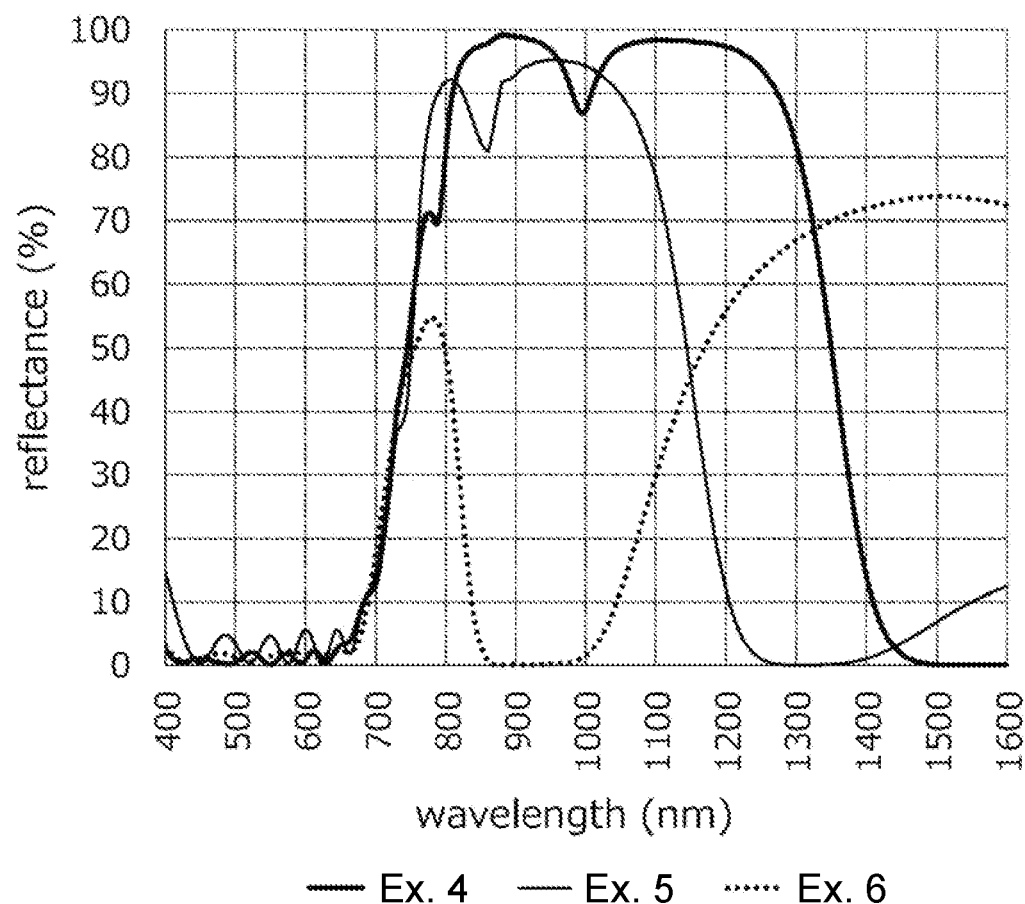
FIG. 6 shows spectral reflectance curves of optical filters of Examples 4-6.

Spectral transmission curves (incident angle: 0°) and spectral reflectance curves (incident angle: 0°) of the optical filters of Examples 1-3 are shown in FIGS. 3 and 4, respectively. Spectral transmission curves (incident angle: 0°) and spectral reflectance curves (incident angle: 0°) of the optical filters of Examples 4-6 are shown in FIGS. 5 and 6, respectively. Each spectral reflectance curve was measured from the side of the dielectric multilayer film (visible light-antireflection and near infrared light-transmission film). Reflectance values $R_{400-680}$ were measured from the side of the dielectric multilayer film (visible light-antireflection, near infrared light-transmission film), and reflectance values $R_{880-920}$, $R_{1310-1350}$, $R_{1530-1570}$ were measured from the side of the dielectric multilayer film (visible light-absorption and near infrared light-transmission film).

Examples 1, 2, 4, 5, and 6 are Inventive Examples and Example 3 is a Comparative Example.

TABLE 1

|  |  | Ex. 1 | Ex. 2 | Ex. 3 | Ex. 4 | Ex. 5 | Ex. 6 |
|---|---|---|---|---|---|---|---|
| Dielectric multilayer film (visible light-absorption and near infrared light-transmission film) | Thickness (μm) | 1.0 | 0.7 | 1.1 | 1.3 | 1.1 | 0.9 |

TABLE 1-continued

|  |  |  | Ex. 1 | Ex. 2 | Ex. 3 | Ex. 4 | Ex. 5 | Ex. 6 |
|---|---|---|---|---|---|---|---|---|
| Dielectric multilayer film (visible light-antireflection and near infrared light-transmission film) | Thickness (μm) | | 1.0 | 1.0 | 0.8 | 1.8 | 1.5 | 0.3 |
| Optical characteristics of high-reflective index film (amorphous silicon) | Extinction coefficient | $k_{600}$ | 0.1820 | 0.6194 | 0.0346 | 0.4601 | 0.4601 | 0.4119 |
|  |  | $k_{800-1000MIN}$ | 0.0085 | 0.0491 | 0.0001 | 0.0005 | 0.0005 | 0.0009 |
|  |  | $k_{1310-1350MIN}$ | — | — | — | — | 9.8E−07 | — |
|  |  | $k_{1530-1570MIN}$ | 0.0001 | 0.0015 | 0.0000 | 1.9E−08 | — | — |
|  | Spin density (/(nm·cm²)) | | 1.94E+11 | 2.42E+12 | 5.48E+09 | 1.95E+12 | 1.95E+12 | 1.21E+12 |
| Optical characteristics of optical filter | Maximum reflectance $R_{400-680MAX}$ (%) | | 0.9 | 0.8 | 2.7 | 9.1 | 14.6 | 5.3 |
|  | Maximum transmittance $T_{400-680MAX}$ (%) | | 1.7 | 0.0 | 81.7 | 1.5 | 0.1 | 1.2 |
|  | Average reflectance $R_{400-680AVE}$ (%) | | 0.4 | 0.2 | 0.7 | 1.5 | 3.5 | 1.6 |
|  | Maximum reflectance $R_{880-920MAX}$ (%) | | 62.1 | 68.5 | 98.9 | 99.3 | 94.4 | 0.1 |
|  | Minimum transmittance $T_{880-920MIN}$ (%) | | 1.1 | 0.3 | 0.3 | 0.7 | 3.5 | 93.6 |
|  | Maximum reflectance $R_{1310-1350MAX}$ (%) | | — | — | — | — | 0.1 | — |
|  | Minimum transmittance $T_{1310-1350MIN}$ (%) | | — | — | — | — | 99.9 | — |
|  | Maximum reflectance $R_{1530-1570MAX}$ (%) | | 0.1 | 0.0 | 0.1 | 0.0 | — | — |
|  | Minimum transmittance $T_{1530-1570MIN}$ (%) | | 99.7 | 99.9 | 99.8 | 100.0 | — | — |

It is seen from the above results that the optical filters of Examples 1, 2, 4, 5, and 6 in which the high-refractive index film satisfies the prescribed characteristics are superior in the ability to block visible light in the wavelength range of 400 to 680 nm and the transmittance of near infrared light that is 800 nm or longer in wavelength.

On the other hand, the optical filter of Example 3 in which the extinction coefficient $k_{600}$ of the high-refractive index film is not larger than or equal to 0.12 is low in the ability to block visible light in the wavelength range of 400 to 680 nm.

While the present invention has been described in detail and with reference to specific embodiments thereof, it will be apparent to one skilled in the art that various changes and modifications can be made therein without departing from the spirit and scope thereof.

Being superior in the transmittance of near infrared light and the ability to block visible light, the optical filter according to the invention is useful when applied to information acquiring devices such as a camera and a sensor for transport machines that have been being increased in performance in recent years.

What is claimed is:

1. An optical filter, comprising:
a substrate; and
a dielectric multilayer film formed on at least one major surface of the substrate and comprising at least two films different from each other such that the at least two films includes a film having a spin density of $5.0 \times 10^{10}$/(nm·cm²) or higher,
wherein the optical filter satisfies a maximum transmittance $T_{400-680MAX}$ in a wavelength range of 400 nm to 680 nm is 6% or lower and at least one of a maximum reflectance $R_{400-680MAX}$ and an average reflectance $R_{400-680AVE}$ in the wavelength range of 400 nm to 680 nm is 10% or lower, and the optical filter is configured to transmit light in a wavelength range of 1530 nm to 1570 nm, and
wherein the optical filter has a minimum transmittance $T_{1530-1570MIN}$ of 90% or higher in a wavelength range of 1530 nm to 1570 nm.

2. The optical filter according to claim 1, wherein the dielectric multilayer film has a thickness of 2.0 μm or smaller.

3. The optical filter according to claim 1, wherein the film having the spin density of $5.0 \times 10^{10}$/(nm·cm²) or higher in the dielectric multilayer film is a silicon film.

4. The optical filter according to claim 1, wherein the film having the spin density of $5.0 \times 10^{10}$/(nm·cm²) or higher in the dielectric multilayer film satisfies that an extinction coefficient $k_{600}$ at a wavelength of 600 nm is 0.12 or larger and that a minimum extinction coefficient $k_{1530-1570MIN}$ in a wavelength range of 1530 nm to 1570 nm is 0.01 or smaller.

5. The optical filter according to claim 1, wherein the dielectric multilayer film has a thickness of 2.0 μm or smaller.

6. The optical filter according to claim 1, wherein the film having the spin density of $5.0 \times 10^{10}$/(nm·cm²) or higher in the dielectric multilayer film is a silicon film.

7. The optical filter according to claim 1, wherein the film having the spin density of $5.0 \times 10^{10}$/(nm·cm²) or higher in the dielectric multilayer film satisfies that an extinction coefficient $k_{600}$ at a wavelength of 600 nm is 0.12 or larger and that a minimum extinction coefficient $k_{1530-1570MIN}$ in a wavelength range of 1530 nm to 1570 nm is 0.01 or smaller.

8. The optical filter according to claim 2, wherein the film having the spin density of $5.0 \times 10^{10}$/(nm·cm²) or higher in the dielectric multilayer film is a silicon film.

9. The optical filter according to claim 2, wherein the film having the spin density of $5.0 \times 10^{10}$/(nm·cm²) or higher in the dielectric multilayer film satisfies that an extinction coefficient $k_{600}$ at a wavelength of 600 nm is 0.12 or larger and that a minimum extinction coefficient $k_{1530-1570MIN}$ in a wavelength range of 1530 nm to 1570 nm is 0.01 or smaller.

10. The optical filter according to claim 3, wherein the film having the spin density of $5.0 \times 10^{10}$/(nm·cm²) or higher in the dielectric multilayer film satisfies that an extinction coefficient $k_{600}$ at a wavelength of 600 nm is 0.12 or larger and that a minimum extinction coefficient $k_{1530-1570MIN}$ in a wavelength range of 1530 nm to 1570 nm is 0.01 or smaller.

11. The optical filter according to claim 2, wherein the film having the spin density of $5.0 \times 10^{10}$/(nm·cm²) or higher in the dielectric multilayer film is a silicon film.

12. The optical filter according to claim 2, wherein the film having the spin density of $5.0 \times 10^{10}$/(nm·cm²) or higher in the dielectric multilayer film satisfies that an extinction coefficient $k_{600}$ at a wavelength of 600 nm is 0.12 or larger and that a minimum extinction coefficient $k_{1530-1570MIN}$ in a wavelength range of 1530 nm to 1570 nm is 0.01 or smaller.

13. The optical filter according to claim 3, wherein the film having the spin density of $5.0\times10^{10}/(nm\cdot cm^2)$ or higher in the dielectric multilayer film satisfies that an extinction coefficient $k_{600}$ at a wavelength of 600 nm is 0.12 or larger and that a minimum extinction coefficient $k_{1530\text{-}1570MIN}$ in a wavelength range of 1530 nm to 1570 nm is 0.01 or smaller.

14. The optical filter according to claim 5, wherein the film having the spin density of $5.0\times10^{10}/(nm\cdot cm^2)$ or higher in the dielectric multilayer film is a silicon film.

15. The optical filter according to claim 5, wherein the film having the spin density of $5.0\times10^{10}/(nm\cdot cm^2)$ or higher in the dielectric multilayer film satisfies that an extinction coefficient $k_{600}$ at a wavelength of 600 nm is 0.12 or larger and that a minimum extinction coefficient $k_{1530\text{-}1570MIN}$ in a wavelength range of 1530 nm to 1570 nm is 0.01 or smaller.

16. The optical filter according to claim 11, wherein the film having the spin density of $5.0\times10^{10}/(nm\cdot cm^2)$ or higher in the dielectric multilayer film satisfies that an extinction coefficient $k_{600}$ at a wavelength of 600 nm is 0.12 or larger and that a minimum extinction coefficient $k_{1530\text{-}1570MIN}$ in a wavelength range of 1530 nm to 1570 nm is 0.01 or smaller.

17. The optical filter according to claim 1, wherein the dielectric multilayer film comprises the at least two films comprising a low-refractive index film and a high-refractive index film such that the high-refractive index film has the spin density of $5.0\times10^{10}/(nm\cdot cm^2)$ or higher.

18. The optical filter according to claim 1, wherein the spin density of the film in the dielectric multilayer film is $1.0\times10^{12}/(nm\cdot cm^2)$ or higher.

19. The optical filter according to claim 17, wherein the spin density of the high-refractive index film in the dielectric multilayer film is $1.0\times10^{12}/(nm\cdot cm^2)$ or higher.

* * * * *